United States Patent

[11] 3,570,763

[72] Inventor Nathaniel Hughes
 Beverly Hills, Calif.
[21] Appl. No. 778,139
[22] Filed Nov. 22, 1968
[45] Patented Mar. 16, 1971
[73] Assignee Energy Sciences, Inc.
 El Segundo, Calif.

[54] STREAMING
 5 Claims, 4 Drawing Figs.
[52] U.S. Cl. .................................................. 239/8,
 239/102
[51] Int. Cl. .................................................. A01n 17/02
[50] Field of Search .......................................... 239/427.5,
 8, 102; 137/81.5

[56] References Cited
UNITED STATES PATENTS
3,182,675 5/1965 Zilberfarb et al. ............ 137/81.5
Primary Examiner—Lloyd L. King
Assistant Examiner—Thomas C. Culp, Jr.
Attorney—William W. Rymer ABSTRACT: An even number of small holes of circular cross section are arranged adjacent the inlet to a supersonic nozzle sculpted in boundary layer, each small hole being in series with the nozzle and included in a pair of such holes spaced 180° apart at opposite sides of said inlet.

PATENTED MAR 16 1971    3,570,763

STREAMING

This invention relates to streaming at supersonic speeds using small nozzles of the general character disclosed in the pending applications of Nathaniel Hughes, Ser. No. 718,447, filed Apr. 3, 1968, "Supersonic Streaming;" and Ser. No. 734,089, filed Jun. 3, 1968, "Streaming," in which effective nozzle surfaces within essentially cylindrical bores are defined by boundary layer effects.

A primary object of the invention is to increase the intensity of shock at the outlet of such nozzles. In preferred embodiments another object is to produce beats. In preferred embodiments in jet aircraft engines other objects are to improve fuel atomization (including provision of sufficient atomization to enable efficient burning at low air pressure and flow rate during engine startup and reduction of smoke) and to make possible selectively wider atomized stream cone angles.

The invention features at least one pair of very small holes, circular in cross section and arranged 180° apart on opposite sides of the inlet to a supersonic nozzle, the small holes being in series with the nozzle. In preferred embodiments the small holes are so made that flow through them is supersonic. In other preferred embodiments there are at least four of the very small holes, with axes spaced 90° from one another. In another aspect the invention features producing beats by providing supersonic flow through at least one pair of the very small holes 180° apart on opposite sides of the inlet to a supersonic nozzle.

Other objects, advantages, and features of the invention will be apparent from the following description of a preferred embodiment thereof, taken together with the drawings, in which.

Figure 1:
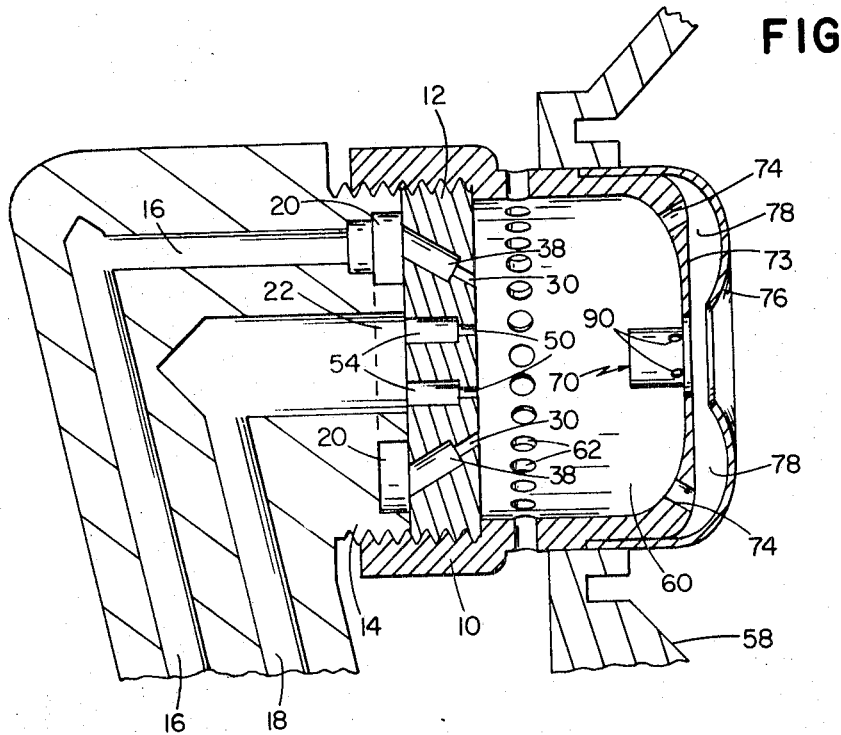
FIG. 1 is a side view, mostly in section, of a portion of a jet aircraft engine embodying the invention.
Figures 3, 4:
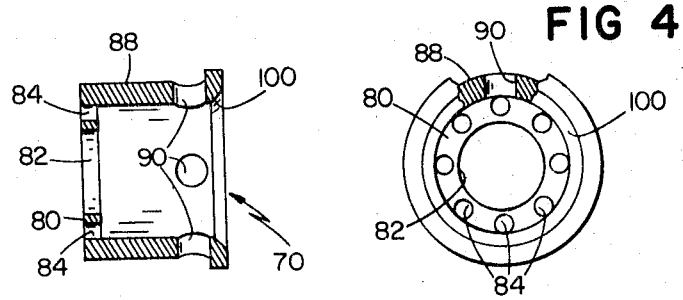
FIG. 3 is a sectional view through the longitudinal axis of the nozzle shown as a part of FIGS. 1 and 2.
FIG. 4 is an end view, partially broken away, of the nozzle of FIG. 3.
Figure 2:
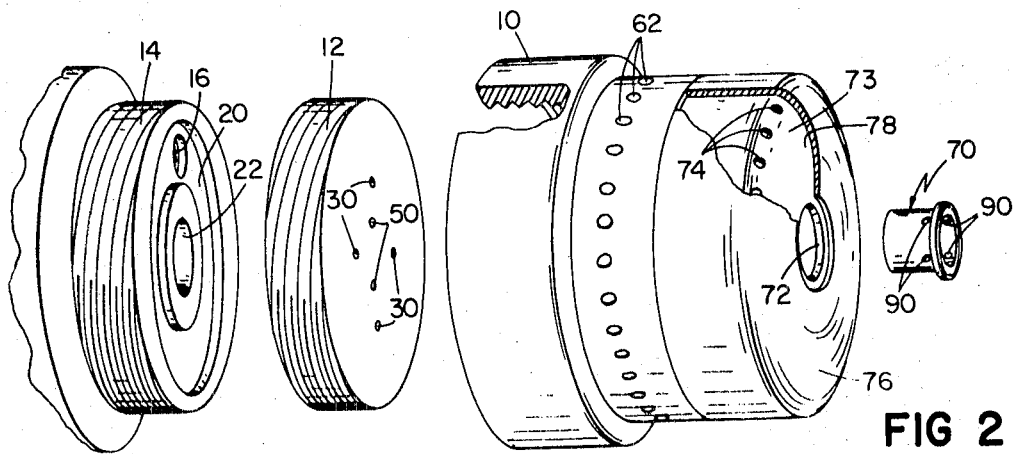
FIG. 2 is an exploded isometric view thereof.

Referring to FIGS. 1 and 2, nozzle nut 10 is screwed over fuel metering plate 12 and onto pedestal 14, which communicates with a fuel manifold (not shown) through passages 16 and 18. Passages 16 and 18 respectively feed fuel oil to annular recess 20 and bore 22 concentric therewith of pedestal 14. Four oblique fuel inlet holes 30 (each 0.043 inch in diameter) equally spaced circumferentially in plate 12 communicate with recess 20 through enlarged passages 38 (two of which are shown in FIG. 1). Two fuel inlet holes 50 (each 0.02 inch in diameter) communicate through enlarged passages 54 with bore 22.

Forward of plate 12 nut 10 extends into combustion can 58 (a fragment of which is shown in FIG. 1) and defines mixing chamber 60, through the wall of which, outside can 58, extend air inlet holes 62.

Nozzle 70 is welded in countersunk circular opening 72 in front wall 73 of nut 10 centrally of a ring of oblique exit holes 74. Generally annular shroud 76 extends out from nut 10 and bends around in front of holes 74 and then back in toward wall 73 and nozzle 70, defining a zone 78.

Central inlet hole 82 extends through rear wall 80 of nozzle 70 and is concentric with an imaginary circle containing the centers of eight equally spaced smaller inlet holes 84 arranged in pairs, toward opposite ends of diameters of nozzle 70. Cylindrical boundary layer confining wall 88 has, toward its outlet, four radial throat stabilizing holes 90, with coplanar axes spaced 90° from one another. The front of the nozzle is open to the interior of can 58, and includes 45° countersink 100.

In operation, JP-4 jet engine fuel is introduced through holes 30 and 50 into relatively large chamber 60 to mix with air entering through holes 62. The angular relationship of holes 30 causes the streams of fuel to hit one another, improving the mixing. At engine startup the inlet air pressure is, e.g., 0.2 p.s.i.g., air flow is at a rate of 8 lbs./hr., and fuel flow is at a rate of 15 lbs./hr. These figures may increase respectively to 12 p.s.i.g., 200 lbs./hr., and 1100 lbs.hr. during steady operation, after startup. Part of the compressible air-fuel mixture passes through inlet hole 82 into the nozzle defined by boundary layer confined within wall 88. Fluid mixture also moves outside wall 88 and through holes 90 to stabilize the plane of the throat of the nozzle sculpted in boundary layer in the manner taught in the said patent applications. Another part of the mixture passes through holes 84 each of which is small enough to promote within its own confining cylindrical wall sufficient boundary layer growth to provide barely supersonic flow. (Flow within boundary layer confining wall 88 in said nozzle helps to speed up the flow through the holes 84 by increasing the pressure drop thereacoss.)

The characteristic burst frequencies of the main portion of said nozzle, and of the streams leaving holes 84, produce a superheterodyne effect, with resultant beats which may be measured, for example to monitor functioning.

The rest of the mixture in chamber 60 passes through holes 74 into zone 78 and implodes under compressible fluid pressure into the nozzle outlet zone, increasing the shock effects and work done there, and improving atomization.

The included cone angle of the atomized stream, under flow conditions already set forth, is 70° during startup and before ignition, and about 140° at initial ignition, the doubling being attributable to the great intensity of heat owning to localization (through efficient atomization and mixing) of the zone of combustion. During steady operation, after startup, at flow rates above specified, the ignited cone angle may be about 85°.

The preferred embodiment, used in a jet aircraft engine as described, enables the efficient processing of large quantities of fuel even during engine startup when air inlet pressure and flow rate are low. Smoking is reduced, and ignition is facilitated by wide cone angles.

The diameter of hole 82 or the number of holes 84 can be increased to obtain even wider cone angles. Holes 84 must always, however, be arranged in pairs along diameters of hole 82.

Nozzle parameters are calculated in the manner set forth in said pending applications. In the preferred embodiment, the parameters are:

L*    0.187 inch
L     0.282 inch
$D_f$    0.260 inch
$D_j$    0.177 inch
Hole 90 diameter    0.062 inch Each hole 84 has a diameter and length of 0.032 inch. The centerlines of opposing pairs of holes 84 are 0.226 inch apart.

Other embodiments (e.g., in which throat plane stabilizers, preferably thin rings as disclosed in said application Ser. No. 718,447, are employed in holes 84) will occur to those skilled in the art and are within the following claims:

I claim:

1. A supersonic nozzle device comprising:
   a boundary layer confining wall with inlet and outlet ends and a throat plane stabilizer intermediate thereof;
   a portion at said inlet end defining a nozzle inlet for receiving a subsonic stream to be given a transonic speed at said plane and to be discharged as a supersonic stream at said outlet end; and
   an even number of holes of circular cross section arranged adjacent said inlet and discharging into zones adjacent the interior of said wall, said holes each being of smaller diameter than said confining wall, each said hole being included in a pair of said holes spaced 180° apart at opposite sides of said inlet, said throat plane stabilizer comprising throat stabilizing holes extending through said wall downstream of the first-mentioned holes.

2. The nozzle device of claim 1 in which said holes are constructed to provide for supersonic fluid flow therethrough.

3. The nozzle device of claim 1 in which there are at least four said holes.

4. The nozzle device of claim 3 in which four of said holes are spaced 90° from one another.

5. The method of producing beats comprising the steps of:
providing a supersonic nozzle having a boundary layer confining wall with inlet and outlet ends, a throat plane stabilizer therebetween, and a portion at said inlet end defining an inlet for receiving a subsonic stream to be given a transonic speed at said plane and to be discharged as a supersonic stream at said outlet end; and providing supersonic fluid flow through an even number of holes of circular cross section arranged adjacent said inlet and discharging into zones adjacent the interior of said wall, said holes each being of smaller diameter than said confining wall, each said hole being included in a pair of said holes spaced 180° apart at opposite sides of said inlet.